United States Patent
Oh et al.

(10) Patent No.: US 11,764,428 B2
(45) Date of Patent: Sep. 19, 2023

(54) LITHIUM-AIR BATTERY INCLUDING A REDOX MEDIATOR AND PROTECTIVE LAYER, AND METHOD OF MANUFACTURING THE SAME

(71) Applicants: Hyundai Motor Company, Seoul (KR); Kia Corporation, Seoul (KR); Korea Institute of Science and Technology, Seoul (KR)

(72) Inventors: Gwang Seok Oh, Gyeonggi-do (KR); Kyoung Han Ryu, Gyeonggi-do (KR); Young Suk Cho, Sejong (KR); Won Keun Kim, Seoul (KR); Hun Gi Jung, Seoul (KR); Seung Ho Yu, Seoul (KR); Min Ah Lee, Seoul (KR); Hee Dae Lim, Seoul (KR); Min Gi Jeong, Seoul (KR)

(73) Assignees: Hyundai Motor Company, Seoul (KR); Kia Corporation, Seoul (KR); Korea Institute of Science and Technology, Seoul (KR)

( * ) Notice: Subject to any disclaimer, the term of this patent is extended or adjusted under 35 U.S.C. 154(b) by 50 days.

(21) Appl. No.: 17/544,726

(22) Filed: Dec. 7, 2021

(65) Prior Publication Data
US 2022/0302528 A1 Sep. 22, 2022

(30) Foreign Application Priority Data
Mar. 17, 2021 (KR) .......................... 10-2021-0034644

(51) Int. Cl.
*H01M 12/08* (2006.01)
*H01M 12/02* (2006.01)
*H01M 10/0567* (2010.01)

(52) U.S. Cl.
CPC ....... *H01M 12/08* (2013.01); *H01M 10/0567* (2013.01); *H01M 12/02* (2013.01)

(58) Field of Classification Search
None
See application file for complete search history.

(56) References Cited

U.S. PATENT DOCUMENTS

2017/0317352 A1* 11/2017 Lee .................. H01M 10/0569
2020/0028165 A1* 1/2020 Chiang ................. H01M 4/405

FOREIGN PATENT DOCUMENTS

| KR | 2016-0051059 A | 5/2016 |
| KR | 101786220 B1 | 10/2017 |
| KR | 2017-0133544 A | 12/2017 |
| KR | 2019-0123075 A | 10/2019 |

OTHER PUBLICATIONS

KR20160051059A—machine translation (Year: 2016).*

* cited by examiner

*Primary Examiner* — Haroon S. Sheikh
(74) *Attorney, Agent, or Firm* — Fox Rothschild LLP

(57) ABSTRACT

Disclosed are a lithium-air battery including a redox mediator in an electrolyte and having a protective layer on an anode, and a method of manufacturing the same. The lithium-air battery includes an anode including a lithium metal, a protective layer positioned on the anode and including lithium fluoride (LiF), a cathode, and an electrolyte positioned between the protective layer and the cathode. Particularly, the electrolyte includes a halogen ion ($X^-$) which is a redox mediator.

14 Claims, 7 Drawing Sheets

LITHIUM-AIR BATTERY INCLUDING A REDOX MEDIATOR AND PROTECTIVE LAYER, AND METHOD OF MANUFACTURING THE SAME

CROSS-REFERENCE TO RELATED APPLICATION

This application claims under 35 U.S.C. § 119(a) the benefit of priority to Korean Patent Application No. 10-2021-0034644 filed on Mar. 17, 2021, the entire contents of which are incorporated herein by reference.

TECHNICAL FIELD

The present invention relates to a lithium-air battery including a redox mediator in an electrolyte and having a protective layer on an anode, and a method of manufacturing the same.

BACKGROUND

A lithium secondary battery is a secondary battery having highest energy density among the currently commercialized secondary batteries and may be used in various fields such as electric vehicles.

The commercialized lithium secondary batteries have been limited in application to electric vehicles and large-capacity energy storage systems that require high energy density due to a theoretical energy density limit (250 Wh/kg).

Since the lithium-air battery uses oxygen in air as an active material and has a very high energy density of 3,200 Wh/kg, it has been prominent as the next-generation battery.

However, the lithium-air battery causes an overvoltage in a charging process and has a problem such as low charging/discharging efficiency and degradation of lifespan characteristics because electrical conductivity of lithium peroxide ($Li_2O_2$), which is a discharging product, is very low, such that it is difficult to decompose the lithium peroxide ($Li_2O_2$). For example, the most important research task in the lithium-air battery is to develop an appropriate catalyst capable of decomposing the lithium peroxide.

The initial lithium-air battery used a solid oxygen evolution catalyst. Since the catalyst has been used in a solid phase, it has been difficult for the catalyst to contact lithium peroxide, which is the same solid phase. As a result, the catalyst had low activity and could not solve the above problem.

Accordingly, studies on a liquid catalyst that is present in the electrolyte and may move freely have been conducted. Fluidity of the liquid catalyst has been effective in accelerating the decomposition of lithium peroxide generated in a cathode. However, the liquid catalyst chemically reacted with an anode containing a lithium metal in the electrolyte to degrade the anode, and was rapidly consumed.

SUMMARY

In one preferred aspect, provided is a lithium-air battery including a redox mediator capable of effectively decomposing lithium peroxide, which is a discharge product, to reduce the degree of polarization.

In one preferred aspect, provided is a lithium-air battery capable of preventing the reaction of a redox mediator and a lithium metal to prevent degradation of an anode and rapid consumption of the redox mediator.

An object of the present invention is not limited to the above-mentioned objects. An object of the present invention will become more apparent from the following description, and will be implemented by the means described in the claims and a combination thereof.

In one aspect, a lithium-air battery may include an anode including a lithium metal, a protective layer positioned on the anode and including lithium fluoride (LiF), a cathode, and an electrolyte positioned between the protective layer and the cathode. In particular, the electrolyte may include a halogen ion ($X^-$) which is a redox mediator.

The protective layer may have a thickness of about 0.05 μm to 200 μm.

The redox mediator may include one or more selected from bromine ion ($Br^-$), and iodine ion ($I^-$).

The concentration of the redox mediator in the electrolyte may be about 0.1 M to 1 M.

The lithium fluoride (LiF) and the redox mediator may be a product resulting from a reaction of an organic fluorine compound represented by the following Formula 1 and the lithium metal:

$$CF_3(CF_2)_n(CH_2)_mX \qquad \text{[Formula 1]}$$

wherein X includes one or more selected from Br and I, $1 \le n \le 10$, and $0 \le m \le 2$.

The organic fluorine compound may suitably include .

In a further aspect, a method of manufacturing a lithium-air battery is provided, the method comprising: (a) preparing an electrolyte containing an electrolytic solution, a lithium salt, and an organic fluorine compound; (b) injecting the electrolyte between 1) an anode including a lithium metal and 2) a cathode; and (c) generating a redox mediator comprising a halogen ion ($X^-$) in the electrolyte. In certain embodiments, the method may comprise a further step (d) of wherein a protective layer comprising lithium fluoride (LiF) is formed on the anode by steps comprising reacting the organic fluorine compound and the lithium metal. In certain aspects, in step (b) a laminate may be formed by injecting the electrolyte between an anode including a lithium metal and a cathode In another aspect, a method of manufacturing a lithium-air battery may include: preparing an electrolyte containing an electrolytic solution, a lithium salt, and an organic fluorine compound; forming a laminate by injecting the electrolyte between an anode including a lithium metal and a cathode; and generating a redox mediator containing a halogen ion ($X^-$) in the electrolyte and forming a protective layer including lithium fluoride (LiF) on the anode by reacting the organic fluorine compound with the lithium metal.

The laminate may be left for 4 hours to 3 days. The organic fluorine compound and the lithium metal in the laminate may react for 4 hours to 3 days.

The redox mediator may include one or more selected from of a bromine ion ($Br^-$), and an iodine ion ($I^-$).

The concentration of the redox mediator in the electrolyte may be about 0.1 M to 1 M.

The protective layer may suitably have a thickness of about 0.05 μm to 200 μm.

In another aspect, a vehicle (including an electric-powered vehicle) is provided that comprises a lithium-air battery as disclosed herein.

Other aspects of the invention are disclosed infra.

DETAILED DESCRIPTION

The above objects, other objects, features, and advantages of the present invention will be easily understood through the following preferred embodiments related to the accompanying drawings. The present invention, however, is not limited to exemplary embodiments described herein and may be embodied in other forms. On the contrary, exemplary embodiments introduced herein are provided to make disclosed contents thorough and complete and sufficiently transfer the spirit of the present invention to those skilled in the art.

It should be understood that term "comprise" or "have", etc., as used herein, specifies the presence of features, numerals, steps, operations, components, parts mentioned herein, or combinations thereof, but do not preclude the presence or addition of one or more other features, numerals, steps, operations, components, parts, or combinations thereof. It will be understood that when an element such as a layer, a film, a region, or a substrate, is referred to as being "on" another element, it may be "directly on" another element or may have an intervening element present therebetween. In contrast, it will be understood that when an element such as a layer, a film, a region, or a substrate is referred to as being "under" another element, it can be "directly under" the other element or intervening elements may also be present.

It should be understood that unless otherwise specified, all numbers, values and/or expressions expressing ingredients, reaction conditions, polymer compositions, and quantities of formulations used herein, are approximations essentially reflecting various uncertainties of the measurement that these numbers result from obtaining these values, among other things, and are therefore modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed herein, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
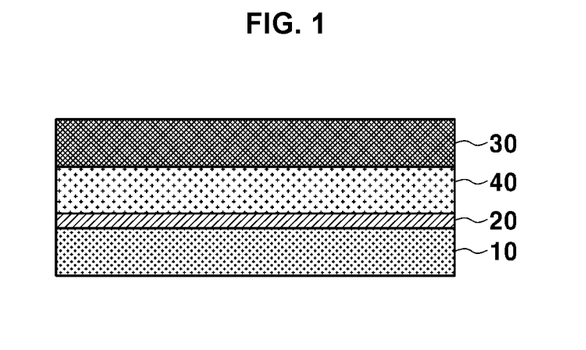
FIG. 1 shows an exemplary lithium-air battery according to an exemplary embodiment of the present invention.

FIG. 1 shows an exemplary a lithium-air battery according to an exemplary embodiment of the present invention. The lithium-air battery may include an anode 10 including a lithium metal, a protective layer 20 positioned on the anode 10 and including lithium fluoride (LiF), a cathode 30, and an electrolyte 40 positioned between the protective layer 20 and the cathode 30.

The lithium-air battery is a battery system that uses oxygen in air as an active material in the cathode 30. In the cathode 10, oxidation and reduction reactions of lithium occur, and in the cathode 30, reduction and oxidation reactions of oxygen introduced from the outside occur.

Reaction Schemes 1 and 2 below show reactions occurring in the anode 10 and the cathode 30 when the lithium-air battery is discharged:

(anode): .  [Reaction Scheme 1]

(cathode): .  [Reaction Scheme 2]

The lithium metal of the anode 10 is oxidized to generate lithium ions and electrons. Lithium ions move to the cathode 30 through the electrolyte 40, and electrons move to the cathode 30 through a current collector and an external conductor. Since the cathode 30 is porous, external air may be introduced. Oxygen contained in the external air is reduced by the electrons in the cathode 30, and $Li_2O_2$ is formed as a discharge product.

The charging reaction proceeds in reverse. $Li_2O_2$ is decomposed in the cathode 30 as shown in Reaction Scheme 3 below to generate lithium ions and electrons:

(cathode) $Li_2O_2 \rightarrow 2Li^+ + O_2 + 2e^-$. [Reaction Scheme 3]

Hereinafter, each configuration of the lithium-air battery will be described in detail.

The anode 10 may include a lithium metal or a lithium metal alloy.

The lithium metal alloy may include an alloy of lithium and a metal or a metalloid capable of alloying with lithium.

The metal or the metalloid capable of alloying with lithium may include one or more selected from the group consisting of Si, Sn, Al, Ge, Pb, Bi, and Sb.

The lithium metal may have a high electric capacity per unit weight, and may be thus advantageous for implementation of a high-capacity battery. However, the lithium metal may cause a short circuit between the cathode and the anode due to the growth of a dendritic structure during a deposition and dissolution process of lithium ions. In addition, the lithium metal has a high reactivity to the electrolyte, so the lifespan of the battery may be shortened by side reactions therebetween. Meanwhile, since the lithium metal has a large volume change during the charging and discharging process, lithium dissolution may occur from the anode.

Accordingly, the present invention prevents the above-mentioned problems from occurring by forming a protective layer 20 including lithium fluoride (LiF) having high chemical stability on the anode 10.

The protective layer 20 may block direct contact between the anode 10 and the electrolyte 40 to suppress side reactions.

In an aspect, provided is a manufacturing method capable of easily forming the protective layer 20.

The cathode 30 may include a carbon material, a binder, and the like.

The carbon material is not particularly limited, and may include a carbon nanotube, and the like.

The binder may include a component that bonds between carbon materials, and without particular limitation, may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like.

The electrolyte 40 may be a component responsible for the movement of lithium ions between the anode 10 and the cathode 30, and may include an electrolyte, a lithium salt, and an organic fluorine compound.

The electrolyte 40 may be positioned between the protective layer 20 and the cathode 30. The electrolyte 40 may be impregnated in a separator (not illustrated).

The electrolyte may include a kind of organic solvent and is not limited as long as it can be used for a lithium-air battery. The electrolyte may include, for example, one or more selected from the group consisting of ethylene carbonate, dimethyl carbonate, diethyl carbonate, ethyl methyl carbonate, fluoroethylene carbonate, 1,2-dimethoxy ethane, 1,2-diethoxyethane, dimethylene glycol dimethyl ether, trimethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, and dimethylacetamide.

The lithium salt is not limited as long as it can be used for a lithium-air battery, and may include, for example, one or more selected from the group consisting of $LiNO_3$, $LiPF_6$, $LiBF_6$, $LiClO_4$, $LiCF_3SO_3$, LiBr, and LiI.

The redox mediator may be a component that decomposes lithium peroxide, which is a discharge product, by facilitating the reaction of Reaction Scheme 3 described above. Accordingly, the energy efficiency of the battery may be increased, and the lifespan may be prolonged.

The redox mediator may include a halogen ion ($X^-$). The mechanism of the redox mediator is briefly described as follows:

$3X^- \rightarrow X_3^- + 2e^-$ $Li_2O_2 + X_3^- \rightarrow 2Li^+ + O_2 + 6X^-$ [Reaction Scheme 4]

During charging, halogen ions ($X^-$) may be oxidized before lithium peroxide ($Li_2O_2$), and $X_3^-$ in an oxidized state moves in the electrolyte and may contact lithium peroxide ($Li_2O_2$).

$X_3^-$ may obtain electrons from lithium peroxide ($Li_2O_2$) and may be reduced to halogen ions ($X^-$) to return to its original state, and lithium peroxide ($Li_2O_2$) may be decomposed into lithium ions ($Li^+$) and oxygen ($O_2$).

In order for the above mechanism to operate smoothly, the redox mediator needs to be oxidized before lithium peroxide. This means that oxidation potential (or oxidation voltage) of the redox mediator needs to be greater than equilibrium potential of lithium peroxide.

However, if the difference between the oxidation potential of the redox mediator and the equilibrium potential of lithium peroxide is too large, voltage applied to the battery may be increased, thereby degrading charging/discharging efficiency (discharging voltage/charging voltage). Thus, the oxidation potential of the redox mediator may be greater than the equilibrium potential of lithium peroxide, but it may be desirable that a difference between them is small.

For example, since the lithium peroxide has an equilibrium potential of about 2.96 V, the oxidation potential of the redox mediator may preferably fall within the range of 3.0 V to 4.0 V.

The redox mediator may include one or more selected from a bromine ion ($Br^-$), and an iodine ion ($I^-$).

The concentration of the redox mediator in the electrolyte may be about 0.1 M to 1 M.

Lithium fluoride (LiF) constituting the protective layer 20 and the redox mediator in the electrolyte 40 may be a product resulting from a spontaneous reaction of an organic fluorine compound represented by the following Formula 1 and a lithium metal in the anode 10:

$CF_3(CF_2)_n(CH_2)_mX$ [Formula 1]

wherein X includes one or more selected from Br and I, $1 \leq n \leq 10$, and $0 \leq m \leq 2$.

The organic fluorine compound may suitably include $CF_3(CF_2)_2I$.

In one aspect, provided is a method of manufacturing a lithium-air battery according to the present invention may include: preparing an electrolyte containing an electrolytic solution, a lithium salt, and an organic fluorine compound; injecting the electrolyte between an anode including a lithium metal and a cathode to obtain a laminate; generating a redox mediator containing a halogen ion ($X^-$) in the electrolyte and forming a protective layer including lithium fluoride (LiF) on the anode by reacting the organic fluorine compound and the lithium metal.

In an aspect, provide is a method of introducing an organic fluorine compound into an electrolyte as an additive, and generating a redox mediator containing a halogen ion in the electrolyte and forming a protective layer on an anode through a spontaneous chemical reaction between the organic fluorine compound and the lithium metal. Therefore, it is possible to manufacture a lithium-air battery including the redox mediator and the protective layer in a simple process.

The electrolyte may include the organic fluorine compound in a concentration of about 0.1 M to 1 M. The thickness of the protective layer may be changed by adjusting the concentration of the organic fluorine compound.

Thereafter, the electrolyte may be injected between the anode and the cathode to prepare a laminate, and the laminate may be left for a predetermined time to form a protective layer.

When the laminate is left, the organic fluorine compound in the electrolyte may react spontaneously with the lithium metal to generate a redox mediator containing halogen ions in the electrolyte, and a protective layer containing lithium fluoride (LiF) is formed on the surface of the lithium metal. Since lithium fluoride (LiF) does not react with the organic fluorine compound, the reaction between the organic fluorine compound and the lithium metal occurs only on the surface of the lithium metal in which the protective layer is not formed. Thus, the protective layer may be formed with a uniform thickness on the surface of the lithium metal.

The thickness of the protective layer may be adjusted depending on the concentration of the organic fluorine compound within the range of about 0.05 μm to 200 μm.

A time for which the laminate is left is not particularly limited, but may be, for example, about 4 hours to 3 days.

EXAMPLE

Hereinafter, the present invention will be described in detail with reference to the following Example and Comparative Examples. However, the technical idea of the present invention is not limited or confined thereto.

Example $LiNO_3$, a lithium salt, was dissolved in dimethylacetamide (DMA), and 200 mM of $CF_3(CF_2)I$ was added thereto to prepare an electrolyte.

A laminate was made by inserting a separator (GF/F manufactured by Whatman Inc.) between a cathode made of carbon nanotubes (CNTs) and an anode including lithium metal, and the electrolyte was injected into the separator to manufacture a lithium-air battery.

Comparative Example 1

A lithium-air battery was manufactured in the same manner as in the above Example, except that an electrolyte to which $CF_3(CF_2)I$ was not added was used.

Comparative Example 2

A lithium-air battery was manufactured in the same manner as in the above Example, except that LiI was added instead of $CF_3(CF_2)I$ to prepare an electrolyte.

Experimental Example 1

The lithium-air batteries according to the Example, and Comparative Examples 1 and 2 were discharged and charged with a limited capacity of 5 mAh $cm^{-2}$, and charging and discharging characteristics were tested at a constant current density of 0.5 mA $cm^{-2}$. The charging voltage and the discharging voltage were in the range of 2.4 V to 4.5 V. The inside of the cell was adjusted to allow a high-purity oxygen pressure to be maintained at 2 bar continuously.

Figure 2:
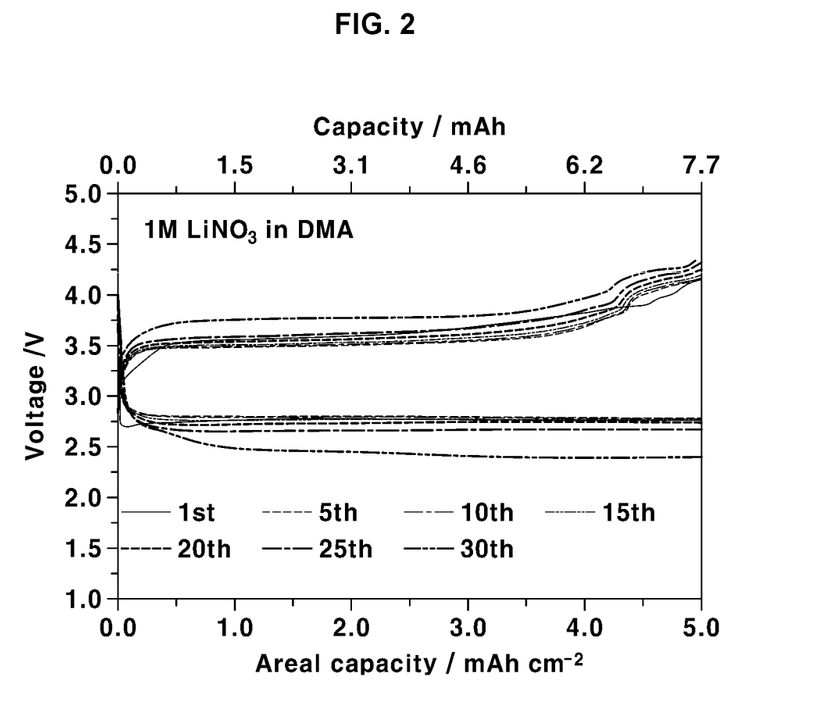
FIG. 2 shows a charging and discharging result of a lithium-air battery in Comparative Example 1.

FIG. 2 shows a charging and discharging result of a lithium-air battery in Comparative Example 1. In Comparative Example 1, the lithium-air battery was stably driven while maintaining a discharging voltage of 2.74 V and maintaining a charging voltage of 3.5 V in 1 to 25 cycles. However, after 30 cycles, charging/discharging overvoltages were increased, resulting in a sharp decrease in energy efficiency.

Figure 3:
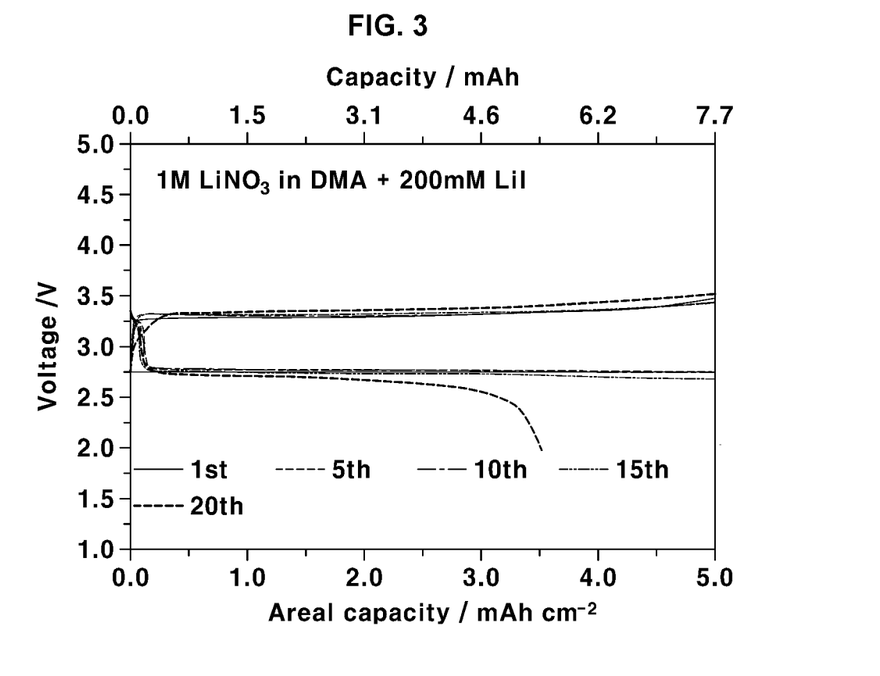
FIG. 3 shows is a charging and discharging result of a lithium-air battery according to Comparative Example 2.

FIG. 3 shows a charging and discharging result of a lithium-air battery in Comparative Example 2. In Comparative Example 2, the lithium-air battery was stably driven while maintaining a discharging voltage of 2.74 V and maintaining a charging voltage of 3.2 V according to a redox reaction of $3I^-\leftrightarrow I_3^-+2e^-$ in 1 to 15 cycles. Thus, the charging/discharging overvoltages were decreased when an electrolyte containing $I^-$ is used. Meanwhile, a low overvoltage refers to the decomposition of a discharge product by the redox mediator, but the performance of the lithium-air battery was rapidly degraded due to a side reaction between the lithium metal and the redox mediator.

Figure 4:
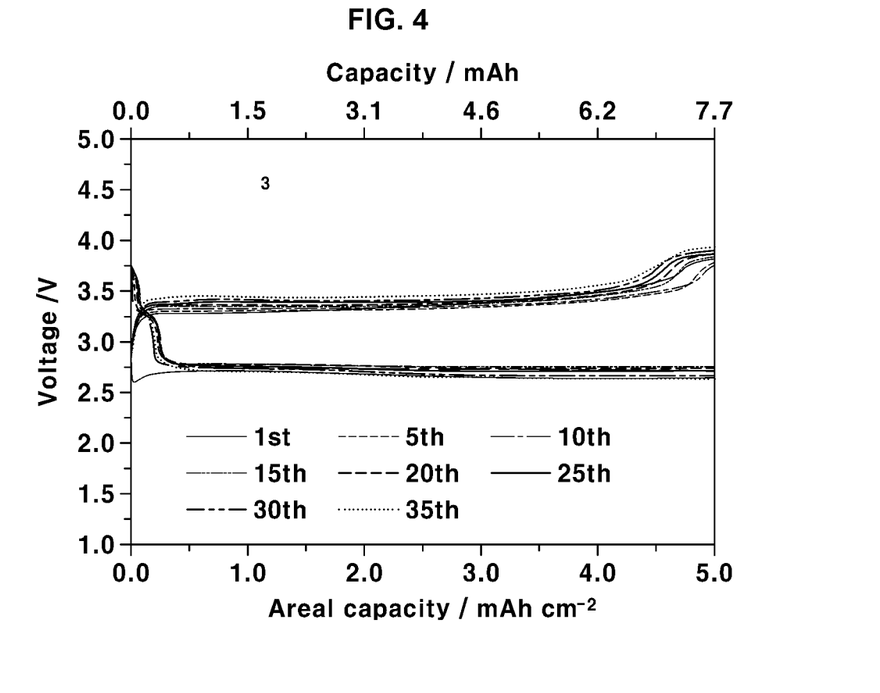
FIG. 4 shows a charging and discharging result of an exemplary lithium-air battery in Example according to an exemplary embodiment of the present invention.

FIG. 4 shows a charging and discharging result of a lithium-air battery in the Example according to an exemplary embodiment of the present invention. In the Example, the lithium-air battery was stably driven while maintaining a discharge voltage of 2.74 V and a charging voltage of 3.3 V in 1 to 35 cycles. The lifespan characteristics of the lithium-air battery in the Example were improved as compared with FIG. 3, which is the result of Comparative Example 2 that included $I^-$, but does not include the protective layer on the lithium metal. Accordingly, a lithium-air battery having both a redox mediator in the electrolyte and a protective film including lithium fluoride (LiF) has improved lifespan characteristics and energy density.

Experimental Example 2

Figure 5:
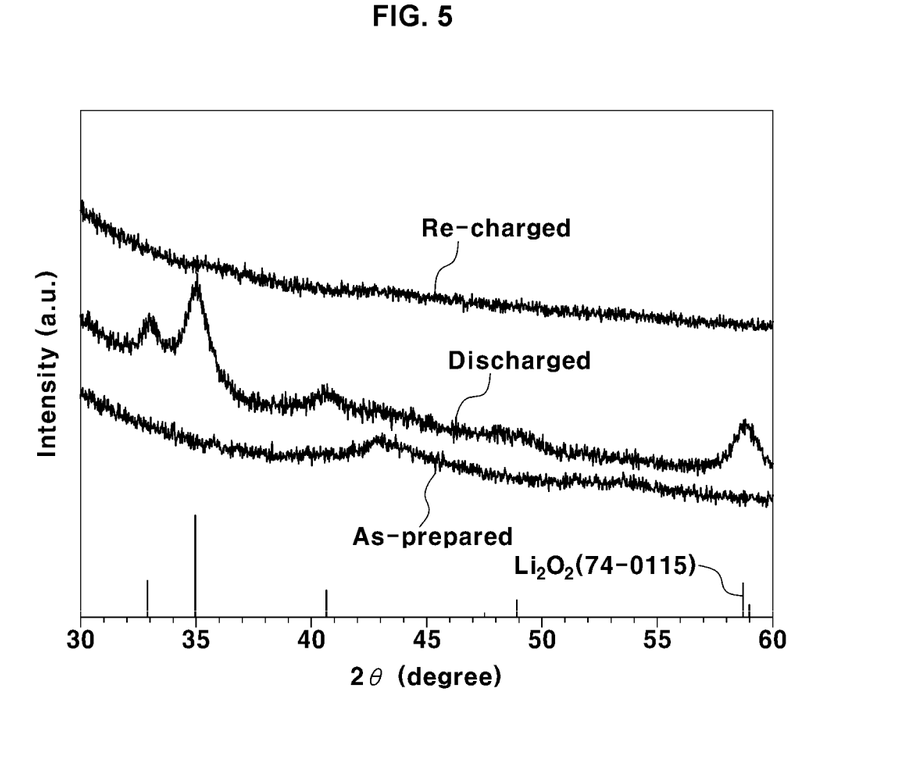
FIG. 5 shows an X-ray diffraction analysis (XRD) result of an exemplary cathode during a charging/discharging process of the lithium-air battery in Example according to an exemplary embodiment of the present invention.

FIG. 5 shows an X-ray diffraction analysis (XRD) result of a cathode during a charging/discharging process of the lithium-air battery according to the Example. A peak of lithium peroxide ($Li_2O_2$), which is a discharge product, was generated around 35° after discharging. The peak of lithium peroxide ($Li_2O_2$) disappeared after re-charging. This means that the redox mediator according to the present invention may properly decompose the discharge product without causing side reactions.

Figure 6A:
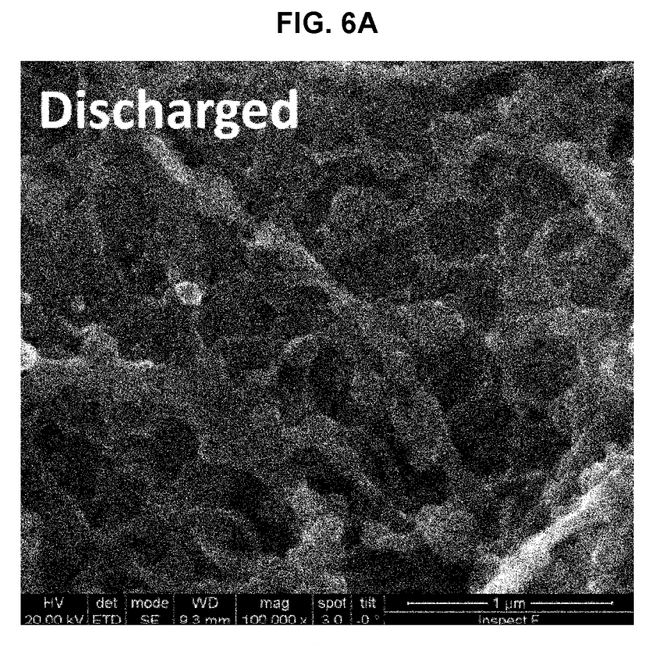
FIG. 6A shows a scanning electron microscope analysis result of a discharged cathode of the lithium-air battery in Example according to an exemplary embodiment of the present invention.
Figure 6B:
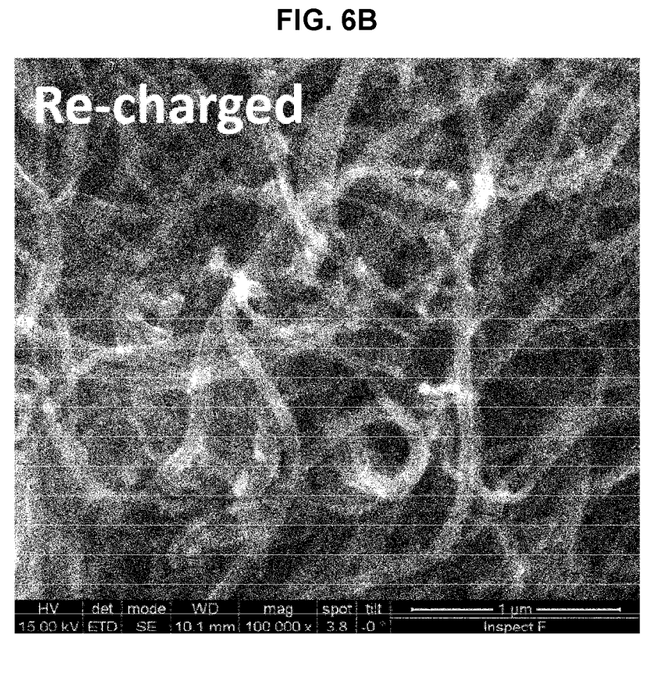
FIG. 6B shows a scanning electron microscope analysis result of a charged cathode of the lithium-air battery in Example according to an exemplary embodiment of the present invention.

FIG. 6A shows a scanning electron microscope analysis result of a discharged cathode of the lithium-air battery in the Example according to an exemplary embodiment of the present invention. As shown in FIG. 6A, lithium peroxide, which is a discharge product, was formed in a ring shape. FIG. 6B is a scanning electron microscope analysis result of a charged cathode of the lithium-air battery according to the Example. It can be seen that the lithium peroxide was completely decomposed after charging.

Experimental Example 3

After the charging/discharging evaluation of the lithium-air battery in Example and Comparative Example 1, the lithium-air battery was decomposed to analyze the lithium metal using X-ray photoelectron spectroscopy.

Figure 7A:
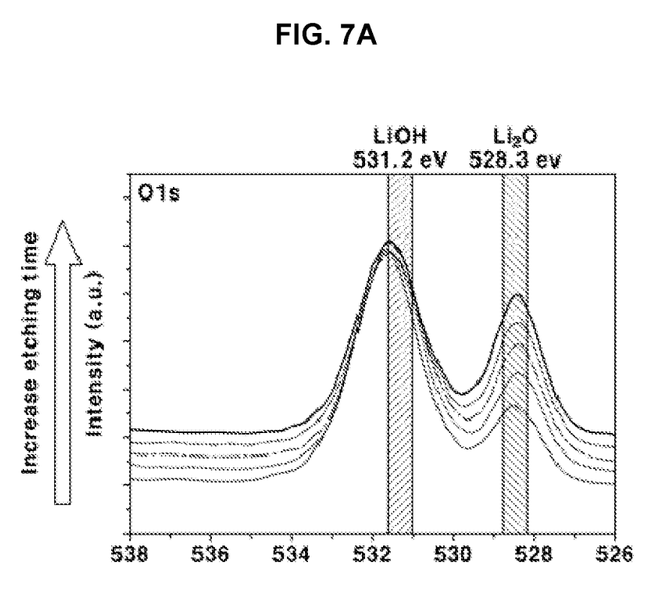
FIG. 7A-7B show results of analyzing the lithium metal with X-ray photoelectron spectroscopy by decomposing the lithium-air battery after the evaluation of charging/discharging of the lithium-air battery in Comparative Example 1.
Figure 7B:
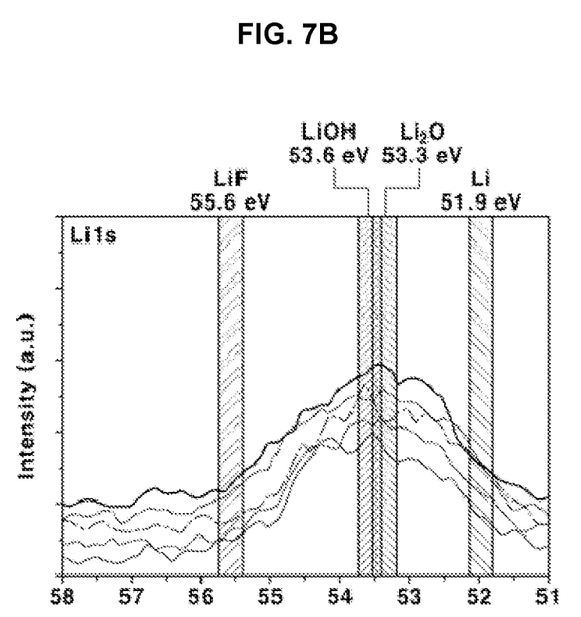

FIGS. 7A-7B show results of Comparative Example 1. LiOH, identified from O1s and Li1s, was dominant compared to $Li_2O$ and was produced by the degradation of lithium metal. As a result, the lithium-air battery of Comparative Example 1 was not smoothly driven.

Figure 8A:
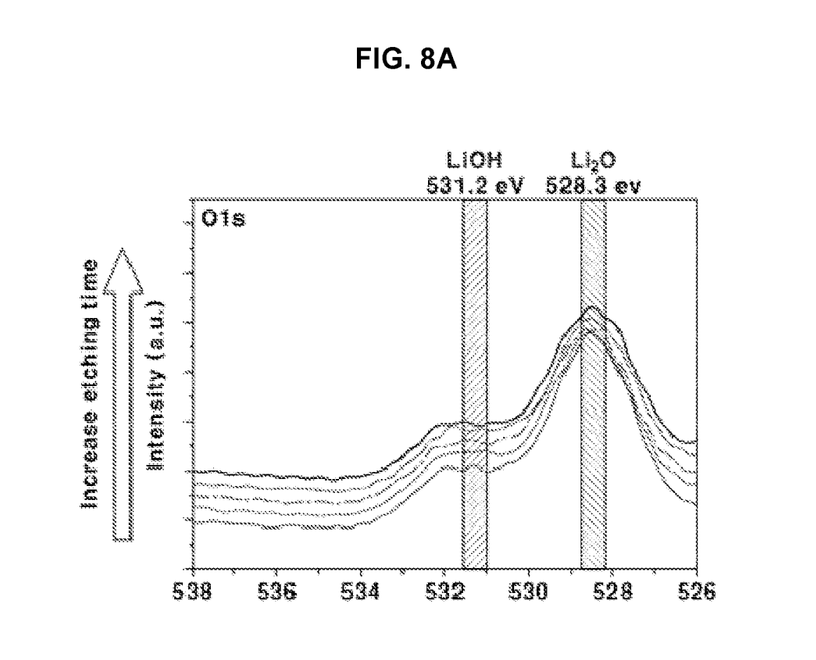
FIG. 8A-8C show result of analyzing the lithium metal with X-ray photoelectron spectroscopy by decomposing the lithium-air battery after the evaluation of charging/discharging of the lithium-air battery in Example according to an exemplary embodiment of the present invention.
Figure 8B:
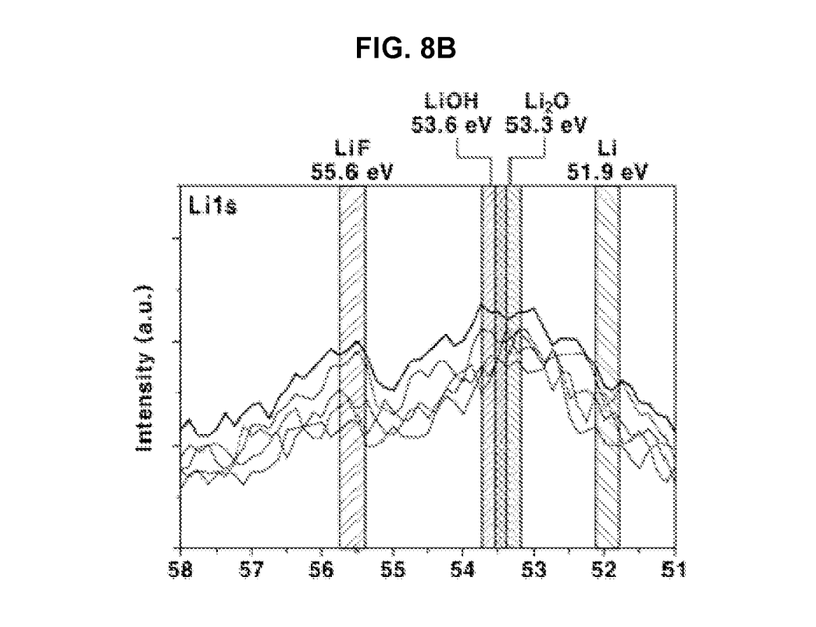
Figure 8C:
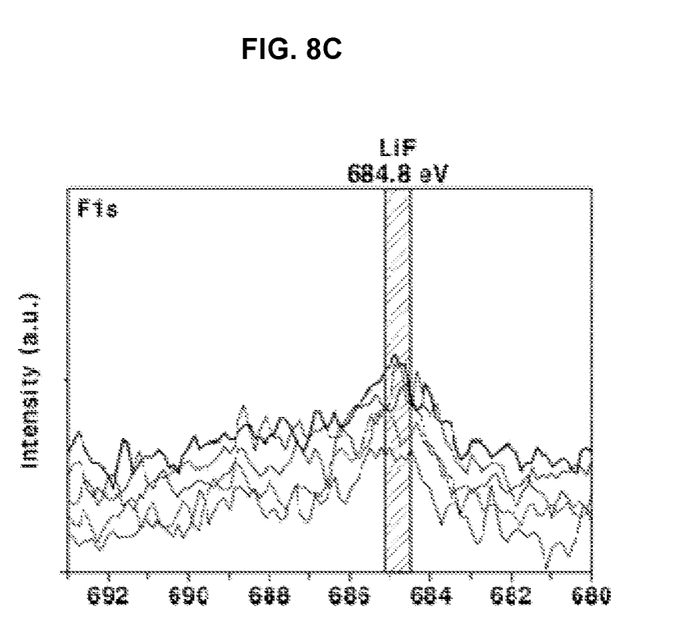

FIGS. 8A-8C show results of the Example. A protective film was formed due to the presence of LiF peaks in Li1s and F1s. In addition, in the result of O1s, $Li_2O$ was dominant compared to LiOH, which is a result of the protective film including lithium fluoride (LiF).

According to various exemplary embodiments of the present invention, a redox mediator included in an electrolyte may effectively decompose lithium peroxide, which is a discharge product, to lower the degree of polarization, thereby greatly improving charging and discharging efficiency and lifespan characteristics of the lithium-air battery.

According to various exemplary embodiments of the present invention, a protective layer on a lithium metal anode may prevent the reaction between the redox mediator in the electrolyte and the lithium metal, thereby suppressing degradation of the anode and rapid consumption of the redox mediator.

The effects of the present invention are not limited to the above-mentioned effects. It should be understood that the effects of the present invention includes all effects that can be inferred from the following descriptions.

As described above, although various exemplary embodiments have been described by the limited embodiments and drawings, various modifications and variations are possible from the above description by those of ordinary skill in the art. For example, appropriate results can be achieved even if the described techniques are performed in a different order from the described method, and/or the described components are joined or combined in a form different from the described method, or are replaced or substituted by other components or equivalents. Thus, other implementations, other embodiments, and equivalents to the claims also fall within the scope of the claims to be described later.

What is claimed is:

1. A lithium-air battery, comprising:
   an anode comprising a lithium metal;
   a protective layer positioned on the anode and comprising lithium fluoride (LiF);
   a cathode; and
   an electrolyte positioned between the protective layer and the cathode,
   wherein the electrolyte comprises a halogen ion ($X^-$) as a redox mediator,
   wherein the lithium fluoride (LiF) and the redox mediator are a product obtained by a reaction of an organic fluorine compound represented by the following Formula 1 and the lithium metal:

$$CF_3(CF_2)_n(CH_2)_mX \qquad \text{[Formula 1]}$$

wherein X comprises one or more selected from Br and I, $1 \leq n \leq 10$, and $0 \leq m \leq 2$.

2. The lithium-air battery of claim 1, wherein the protective layer has a thickness of about 0.05 μm to 200 μm.

3. The lithium-air battery of claim 1, wherein the redox mediator comprises one or more selected from a bromine ion ($Br^-$), and an iodine ion ($I^-$).

4. The lithium-air battery of claim 1, wherein the concentration of the redox mediator in the electrolyte is about 0.1M to 1M.

5. The lithium-air battery of claim 1, wherein the organic fluorine compound comprises $CF_3(CF_2)_2I$.

6. A vehicle comprising a lithium-air battery of claim 1.

7. A method of manufacturing a lithium-air battery, comprising:
   preparing an electrolyte containing an electrolytic solution, a lithium salt, and an organic fluorine compound;
   injecting the electrolyte between 1) an anode including a lithium metal and 2) a cathode; and
   generating a redox mediator comprising a halogen ion ($X^-$) in the electrolyte,
   wherein the organic fluorine compound is represented by the following Formula 1:

$$CF_3(CF_2)_n(CH_2)_mX \qquad \text{[Formula 1]}$$

wherein X comprises one or more selected from of Br and I, $1 \leq n \leq 10$, and $0 \leq m \leq 2$.

8. The method of claim 7 wherein a protective layer comprising lithium fluoride (LiF) is formed on the anode by steps comprising reacting the organic fluorine compound and the lithium metal.

9. The method of claim 7, wherein the organic fluorine compound contains $CF_3(CF_2)_2I$.

10. The method of claim 7, wherein the redox mediator comprises one or more selected from of a bromine ion ($Br^-$), and an iodine ion ($I^-$).

11. The method of claim 7, wherein the concentration of the redox mediator in the electrolyte is about 0.1 M to 1 M.

12. The method of claim 7, wherein the protective layer has a thickness of about 0.05 μm to 200 μm.

13. A method of manufacturing a lithium-air battery, comprising:
   preparing an electrolyte containing an electrolytic solution, a lithium salt, and an organic fluorine compound;
   forming a laminate by injecting the electrolyte between an anode including a lithium metal and a cathode; and
   generating a redox mediator comprising a halogen ion ($X^-$) in the electrolyte and forming a protective layer comprising lithium fluoride (LiF) on the anode by reacting the organic fluorine compound and the lithium metal in the laminate,
   wherein the organic fluorine compound is represented by the following Formula 1:

$$CF_3(CF_2)_n(CH_2)_mX \qquad \text{[Formula 1]}$$

wherein X comprises one or more selected from of Br and I, $1 \leq n \leq 10$, and $0 \leq m \leq 2$.

14. The method of claim 13, wherein the organic fluorine compound and the lithium metal in the laminate react for 4 hours to 3 days.

* * * * *